United States Patent
Chen et al.

(10) Patent No.: US 11,283,855 B1
(45) Date of Patent: Mar. 22, 2022

(54) LATENCY CONTROL NOTIFICATION FOR EDGE CLOUD STREAMING ANALYTICS SERVICE

(71) Applicant: Red Hat, Inc., Raleigh, NC (US)

(72) Inventors: Huamin Chen, Westford, MA (US); Jinjun Xiong, Goldens Bridge, NY (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/143,943

(22) Filed: Jan. 7, 2021

(51) Int. Cl.
| | |
|---|---|
| *H04L 12/26* | (2006.01) |
| *H04L 65/80* | (2022.01) |
| *H04L 43/08* | (2022.01) |
| *H04L 69/326* | (2022.01) |
| *H04L 43/16* | (2022.01) |
| *H04L 65/60* | (2022.01) |
| *H04L 43/10* | (2022.01) |
| *H04N 21/472* | (2011.01) |
| *H04N 5/445* | (2011.01) |
| *H04L 67/10* | (2022.01) |

(52) U.S. Cl.
CPC .............. *H04L 65/80* (2013.01); *H04L 43/08* (2013.01); *H04L 43/10* (2013.01); *H04L 43/16* (2013.01); *H04L 65/60* (2013.01); *H04L 69/326* (2013.01); *H04L 67/10* (2013.01)

(58) Field of Classification Search
USPC ................ 709/223, 224, 203, 219, 220, 206
See application file for complete search history.

(56) References Cited

U.S. PATENT DOCUMENTS

| | | | |
|---|---|---|---|
| 8,365,018 B2 * | 1/2013 | McIntosh | H04L 43/50 714/23 |
| 9,754,624 B2 * | 9/2017 | Dyer-Smith | G11B 27/031 |
| 9,770,657 B2 | 9/2017 | Pearlman et al. | |
| 10,299,016 B2 * | 5/2019 | Zhiwen | H04N 21/8547 |
| 10,638,168 B2 * | 4/2020 | Dunning | H04N 21/8547 |
| 2018/0206136 A1 * | 7/2018 | Chow | H04W 24/08 |

OTHER PUBLICATIONS

"Deliver a reduced-latency HLS stream in Wowza Streaming Cloud," Wowza Media Systems, May 27, 2020.
Ashyin Goal et al., "Low-Latency Adaptive Streaming over TCP," ACM Transactions on Multimedia Computing, Communication and Application, vol. 4, No. 3, Article 20, Aug. 2008.
Ammar Alzaatreh, "Optimize First-Frame Bitrate for HLS with Serverless Edge Compute," StackPath, LLC, Nov. 27, 2019, https://blog.stackpath.com/optimize-hls-bitrate/.

* cited by examiner

*Primary Examiner* — Jude Jean Gilles
(74) *Attorney, Agent, or Firm* — Womble Bond Dickinson (US) LLP

(57) ABSTRACT

A method includes determining a first upload start timestamp and a first upload end timestamp of a video file from a client device to an object storage device. The method further includes monitoring an upload of the video file from the object storage device to a server-less framework to determine a second upload start timestamp and a second upload end timestamp of the video file. The method further includes determining, by a processing device, a latency of the upload in view of the first upload timestamp, the second upload timestamp, the first upload end timestamp, and the second upload end timestamp. The method further includes providing a latency adjustment instruction to the client device in view of the latency.

20 Claims, 6 Drawing Sheets

LATENCY CONTROL NOTIFICATION FOR EDGE CLOUD STREAMING ANALYTICS SERVICE

TECHNICAL FIELD

Aspects of the present disclosure relate to streaming analytics services and more specifically, to a latency control notification for edge cloud streaming analytics services.

BACKGROUND

In computing, a server is a piece of computer hardware or software (computer program) that provides functionality for other programs or devices, called "clients." This architecture is called the client-server model. Servers can provide various functionalities, often called "services," such as sharing data or resources among multiple clients, or performing computation for a client. One such service is a streaming analytics service.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1A:
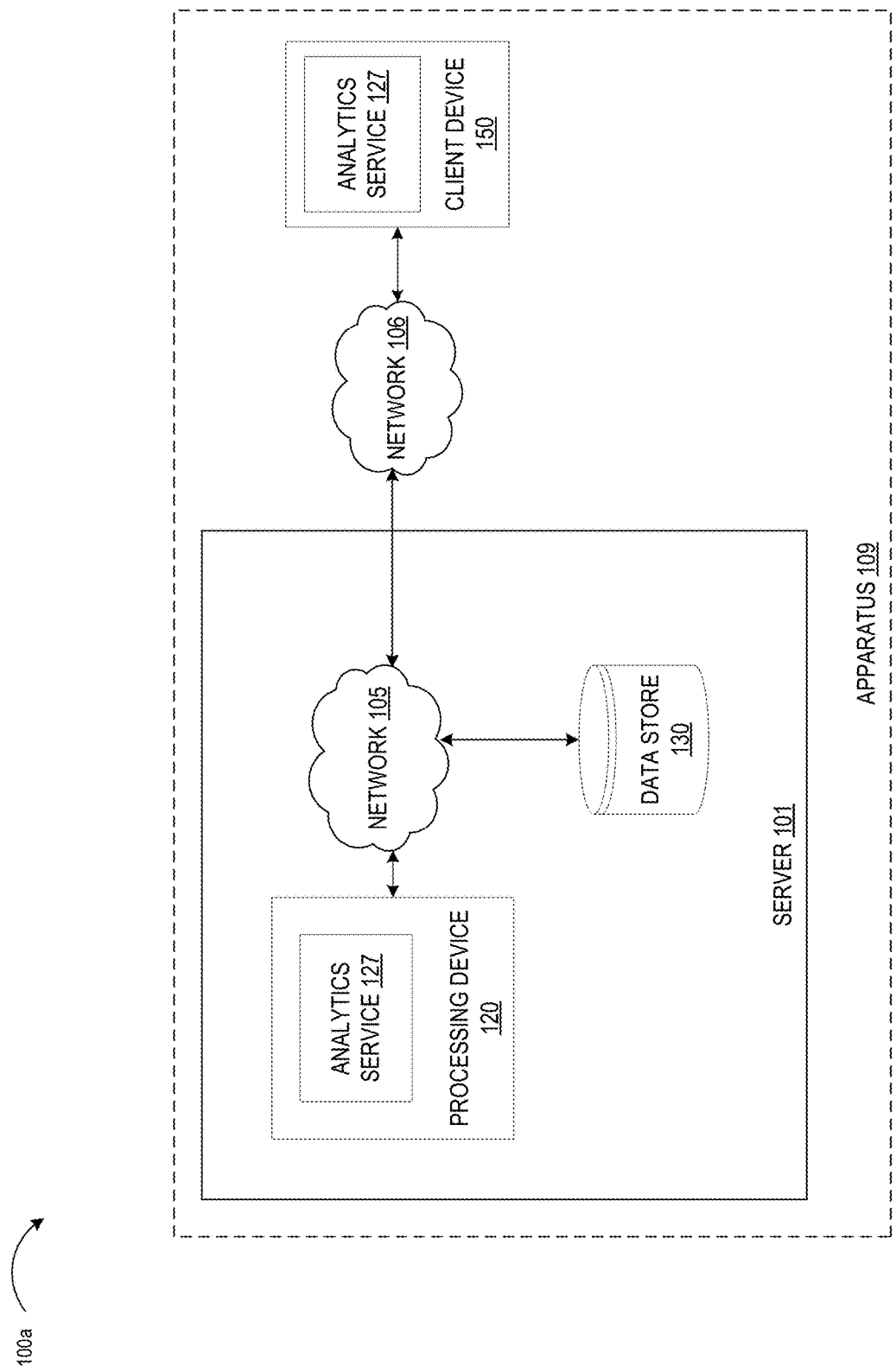
FIG. 1A is a block diagram that illustrates a first example system, in accordance with some embodiments of the present disclosure.

In various embodiments, a host latency control notification for edge cloud streaming analytics service is described herein. As described herein, a server may be a piece of computer hardware or software (computer program) that provides functionality for other programs or devices, called "clients." This architecture is called the client-server model. Servers can provide various functionalities, often called "services," such as sharing data or resources among multiple clients, or performing computation for a client. One or more servers may form a cloud, which may provide a variety of functionality with respect to the edge computing of media files and other file types, as described herein.

In one embodiment, edge computing is a distributed computing paradigm that brings computation and data storage closer to the location where it is needed (e.g., client devices), to improve response times and save bandwidth. Video and other types of media streaming are popular edge computing applications in today's era. Media streaming may be a critical component in sporting-event streaming, internet of things (IoT) applications, autonomous driving, vehicle-to-anything (V2X), remote surgery, remote learning, video surveillance, etc.

As described herein, in one embodiment, a media streaming stack may be built on top of a number of infrastructure services such as server-less, object storage, and artificial intelligence (AI) services. There are a number of challenges in this architecture. One distinguished characteristic of such architectures is the introduction of edge clouds that bring in additional but, not unlimited, computing and storage capabilities into the computing tiers. Because of physical constraints, at each hierarchical level of edge clouds (e.g., from on-premise edge user clouds to telecommunications-operated provider edge clouds), there are usually varying degrees of resource availability. This makes efficient resource management more critical to prevent workloads from being prematurely dropped, to make effective use of limited resources, and to ensure the required level of service quality for all user applications.

In this perspective, ensuring quality of a streaming service is dependent upon the resource availability in a constrained environment at the edge of a computing network. In one non-limiting example of the problems that modern edge computing networks encounter with respect to media files, a typical software architecture is described. The software architecture may include: Gstreamer, a video capture and streaming client; Ceph RGW, an object storage; knative, a server-less framework on Kubernetes; and an image classification service through Tensorflow Serving, an AI inference service.

In this architecture, Gstreamer uploads real-time video to Ceph RGW buckets. Once the video upload is complete, a bucket notification event may be triggered and pushed to the server-less endpoint. The server-less functions download the videos and send them to AI services for inference. As observed, the end-to-end latency considerations may include (1) The time Gstreamer collects video content and uploads to Ceph RGW buckets. Because the number of objects in a bucket cannot grow indefinitely, Gstreamer has to buffer enough content before uploading to the buckets. Thus the more content buffered, the longer the latency. (2) When the content is to be uploaded, the network and Ceph RGW daemon process jointly determine the transmission latency. On 3G/4G network, the upload latency is dominated by radio networks. In a 5G network, the latency is dominated by the TCP connection and Ceph RGW daemon process. (3) Once the content is uploaded, the RGW bucket notification events trigger server-less functions. The server-less function's startup latency is determined by the availability of CPU/Memory resources and the container startup latency. Problematically, because the edge cloud has a limited capacity, spikes in bucket notification events could cause the system to be overloaded and unable to spawn up server-less functions. Such scenarios then cause long tail latency for video streaming services.

In response to the problems described above, and others, a host latency control notification for edge cloud streaming analytics service is described herein. Specifically, such a service may overcome issues related to the upload latency of media files in edge computing networks by explicitly notifying edge streaming processes of the storage and computing resource availability, so that the streaming process can adjust upload transmission control protocol (TCP) windows, upload interval or chunk sizes, or even the quality of the streaming source, to ensure low latency.

FIG. 1A is a block diagram that illustrates a first example system 100*a*, in accordance with some embodiments of the present disclosure. As discussed herein, analytics service 127 may include logic that enables the operations and systems described herein, when executed. In one embodiment, system 100*a* may be described as an apparatus 109, including means for performing the operations described herein (e.g., server 101, network 106, client device 150, etc.). In one embodiment, analytics service 127 resides in whole or in part on a server (e.g., server 101) of system 100*a*. In another embodiment, analytics service 127 resides in whole or in part on an edge network device, such as a client device (e.g., client device 150) of system 100*a*. In yet another embodiment, analytics service 127 resides in whole or in part on any combination of the two, or in a different system entirely.

Server 101 may include various components, which may allow analytics service 127 to run on a server device or client device. Each component may perform different functions, operations, actions, processes, methods, etc., for the embodiments described herein and/or may provide different services, functionalities, and/or resources for the embodiments described herein.

As illustrated in FIG. 1A, server 101 includes an analytics service 127, a computing processing device 120, a data store 130, and a network 105. The analytics service 127, the processing device 120, and the data store 130 may be coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a Wi-Fi hotspot connected with the network 105 and/or a wireless carrier system that can be implemented using various data processing equipment, communication towers (e.g. cell towers), etc.

The network 105 may carry communications (e.g., data, message, packets, frames, etc.) between the various components of server 101. The data store 130 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

Each component may include hardware such as processing devices (e.g., processors, central processing units (CPUs)), memory (e.g., random access memory (RAM)), storage devices (e.g., hard-disk drive (HDD), solid-state drive (SSD), etc.), and other hardware devices (e.g., sound card, video card, etc.). The server 101 may comprise any suitable type of computing device or machine that has a programmable processor including, for example, server computers, desktop computers, laptop computers, tablet computers, smartphones, set-top boxes, etc. In some examples, the server 101 may comprise a single machine or may include multiple interconnected machines (e.g., multiple servers configured in a cluster). The server 101 may be implemented by a common entity/organization or may be implemented by different entities/organizations. For example, a server 101 may be operated by a first company/corporation and a second server (not pictured) may be operated by a second company/corporation. Each server may execute or include an operating system (OS), as discussed in more detail below. The OS of a server may manage the execution of other components (e.g., software, applications, etc.) and/or may manage access to the hardware (e.g., processors, memory, storage devices etc.) of the computing device.

In one embodiment, server 101 is operably connected to client device 150 via a network 106. Network 106 may be a public network (e.g., the internet), a private network (e.g., a local area network (LAN) or wide area network (WAN)), or a combination thereof. In one embodiment, network 106 may include a wired or a wireless infrastructure, which may be provided by one or more wireless communications systems, such as a Wi-Fi hotspot connected with the network 106 and/or a wireless carrier system that can be implemented using various data processing equipment, communication towers (e.g. cell towers), etc. The network 106 may carry communications (e.g., data, message, packets, frames, etc.) between the various components of system 101. Client device 150 may include analytics service 127, in addition to, or alternatively from, server 101. Further implementation details of the operations performed by system 101 are described with respect to FIGS. 1B-4.

Figure 1B:
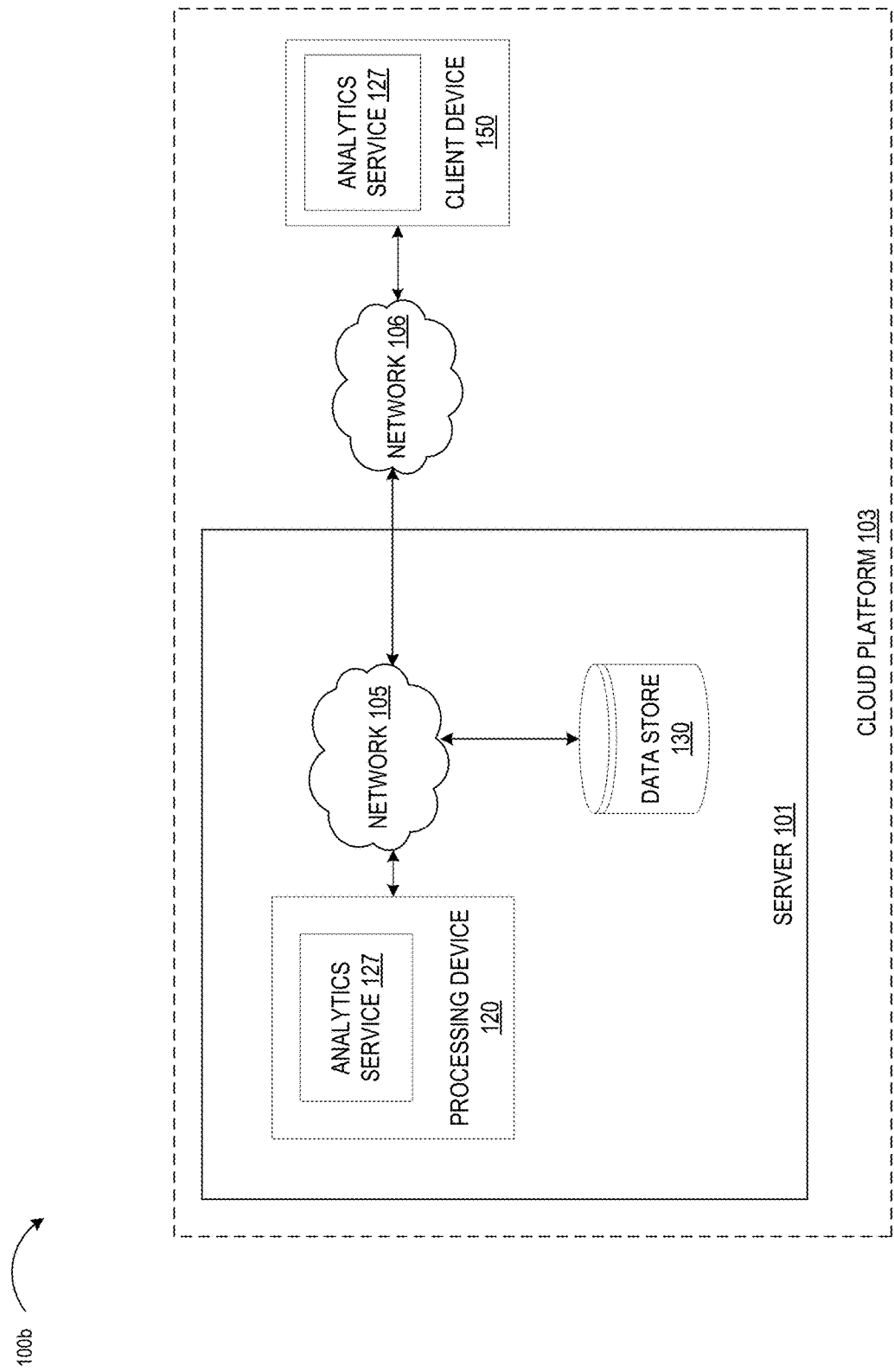
FIG. 1B is a block diagram that illustrates a second example system, in accordance with some embodiments of the present disclosure.

FIG. 1B is a block diagram that illustrates a second example system 100*b*, in accordance with some embodiments of the present disclosure. System 100*b* includes a cloud platform 103, which may include one or more components. As discussed herein, analytics service 127 may include logic that enables the operations and systems described herein, when executed. In one embodiment, system 100*b* may be described as a cloud platform 103, including means for performing the operations described herein (e.g., server 101, network 106, client device 150, etc.). In one embodiment, analytics service 127 resides in whole or in part on a server (e.g., server 101) of system 100*b*. In another embodiment, analytics service 127 resides in whole or in part on a client device (e.g., client device 150) of system 100*b*. In yet another embodiment, analytics service 127 resides in whole or in part on any combination of the two, or in a different system entirely.

Server 101 may include various components, which may allow analytics service 127 to run on a server device or client device. Each component may perform different functions, operations, actions, processes, methods, etc., for the embodiments described herein and/or may provide different services, functionalities, and/or resources for the embodiments described herein.

As illustrated in FIG. 1B, server 101 includes an analytics service 127, a computing processing device 120, a data store 130, and a network 105. The analytics service 127, the processing device 120, and the data store 130 may be coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a Wi-Fi hotspot connected with the network 105 and/or a wireless carrier system that can be implemented using various data processing equipment, communication towers (e.g. cell towers), etc.

The network 105 may carry communications (e.g., data, message, packets, frames, etc.) between the various components of server 101. The data store 130 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

Each component may include hardware such as processing devices (e.g., processors, central processing units (CPUs)), memory (e.g., random access memory (RAM)), storage devices (e.g., hard-disk drive (HDD), solid-state drive (SSD), etc.), and other hardware devices (e.g., sound card, video card, etc.). The server 101 may comprise any suitable type of computing device or machine that has a programmable processor including, for example, server computers, desktop computers, laptop computers, tablet computers, smartphones, set-top boxes, etc. In some examples, the server 101 may comprise a single machine or may include multiple interconnected machines (e.g., multiple servers configured in a cluster). The server 101 may be implemented by a common entity/organization or may be implemented by different entities/organizations. For example, a server 101 may be operated by a first company/corporation and a second server (not pictured) may be operated by a second company/corporation. Each server may execute or include an operating system (OS), as discussed in more detail below. The OS of a server may manage the execution of other components (e.g., software, applications, etc.) and/or may manage access to the hardware (e.g., processors, memory, storage devices etc.) of the computing device.

In one embodiment, server 101 is operably connected to client device 150 via a network 106. Network 106 may be a public network (e.g., the internet), a private network (e.g., a local area network (LAN) or wide area network (WAN)), or a combination thereof. In one embodiment, network 106 may include a wired or a wireless infrastructure, which may be provided by one or more wireless communications systems, such as a Wi-Fi hotspot connected with the network 106 and/or a wireless carrier system that can be implemented using various data processing equipment, communication towers (e.g. cell towers), etc. The network 106 may carry communications (e.g., data, message, packets, frames, etc.) between the various components of system 101. Client device 150 may include analytics service 127, in addition to, or alternatively from, server 101. Further implementation details of the operations performed by system 101 are described with respect to FIGS. 1A and 1C-4.

Figure 1C:
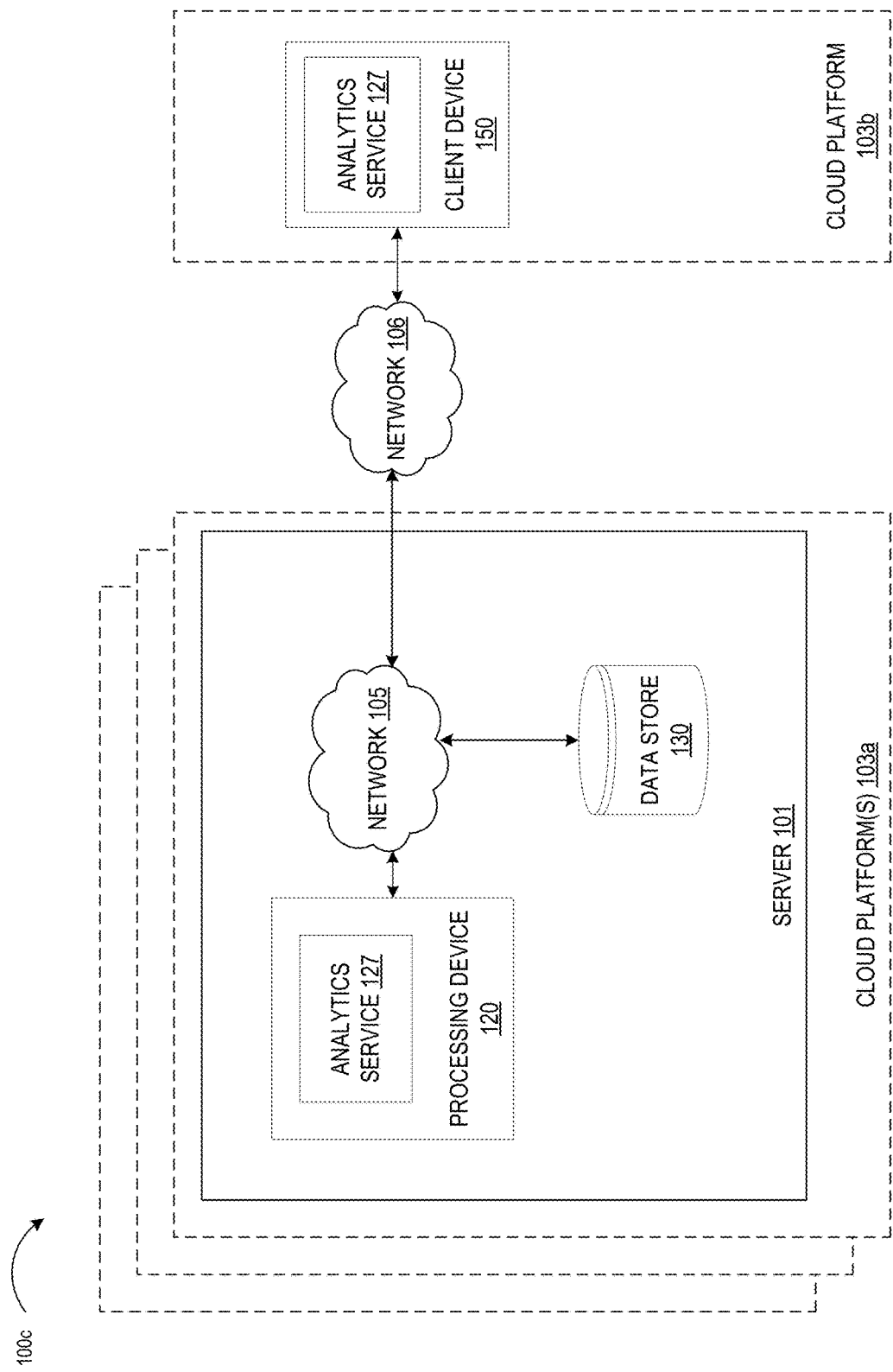
FIG. 1C is a block diagram that illustrates a third example system, in accordance with some embodiments of the present disclosure.

FIG. 1C is a block diagram that illustrates a third example system 100c, in accordance with some embodiments of the present disclosure. System 100b includes one or more cloud platforms 103a and 103b, which may include one or more components. As contemplated herein, cloud platforms 103, 103a, and/or 103b may represent any number of edge and/or central cloud platforms, which may include any number of components (e.g., edge and cloud applications, infrastructure services, workload orchestration components, virtualization components, operating system components, etc.).

As discussed herein, analytics service 127 may include logic that enables the operations and systems described herein, when executed. In one embodiment, system 100c may be described as a cloud platforms 103a and/or 103b, including means for performing the operations described herein (e.g., server 101, network 106, client device 150, etc.). In one embodiment, analytics service 127 resides in whole or in part on a server (e.g., server 101) of system 100c. In another embodiment, analytics service 127 resides in whole or in part on a client device (e.g., client device 150) of system 100c. In yet another embodiment, analytics service 127 resides in whole or in part on any combination of the two, or in a different system entirely.

Server 101 may include various components, which may allow analytics service 127 to run on a server device or client device. Each component may perform different functions, operations, actions, processes, methods, etc., for the embodiments described herein and/or may provide different services, functionalities, and/or resources for the embodiments described herein.

As illustrated in FIG. 1C, server 101 includes an analytics service 127, a computing processing device 120, a data store 130, and a network 105. The analytics service 127, the processing device 120, and the data store 130 may be coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a Wi-Fi hotspot connected with the network 105 and/or a wireless carrier system that can be implemented using various data processing equipment, communication towers (e.g. cell towers), etc.

The network 105 may carry communications (e.g., data, message, packets, frames, etc.) between the various components of server 101 and/or between a variety of cloud platforms (e.g., 103a and 103b). The data store 130 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

Each component may include hardware such as processing devices (e.g., processors, central processing units (CPUs)), memory (e.g., random access memory (RAM)), storage devices (e.g., hard-disk drive (HDD), solid-state drive (SSD), etc.), and other hardware devices (e.g., sound card, video card, etc.). The server 101 may comprise any suitable type of computing device or machine that has a programmable processor including, for example, server computers, desktop computers, laptop computers, tablet computers, smartphones, set-top boxes, etc. In some examples, the server 101 may comprise a single machine or may include multiple interconnected machines (e.g., multiple servers configured in a cluster). The server 101 may be implemented by a common entity/organization or may be implemented by different entities/organizations. For example, a server 101 may be operated by a first company/corporation and a second server (not pictured) may be operated by a second company/corporation. Each server may execute or include an operating system (OS), as discussed in more detail below. The OS of a server may manage the execution of other components (e.g., software, applications, etc.) and/or may manage access to the hardware (e.g., processors, memory, storage devices etc.) of the computing device.

In one embodiment, server 101 is operably connected to client device 150 via a network 106. Network 106 may be a public network (e.g., the internet), a private network (e.g., a local area network (LAN) or wide area network (WAN)), or a combination thereof. In one embodiment, network 106 may include a wired or a wireless infrastructure, which may be provided by one or more wireless communications systems, such as a Wi-Fi hotspot connected with the network 106 and/or a wireless carrier system that can be implemented using various data processing equipment, communication towers (e.g. cell towers), etc. The network 106 may carry communications (e.g., data, message, packets, frames, etc.) between the various components of system 101. Client device 150 may include analytics service 127, in addition to, or alternatively from, server 101. Further implementation details of the operations performed by system 101 are described with respect to FIGS. 1A-B and 2-4.

Figure 2:
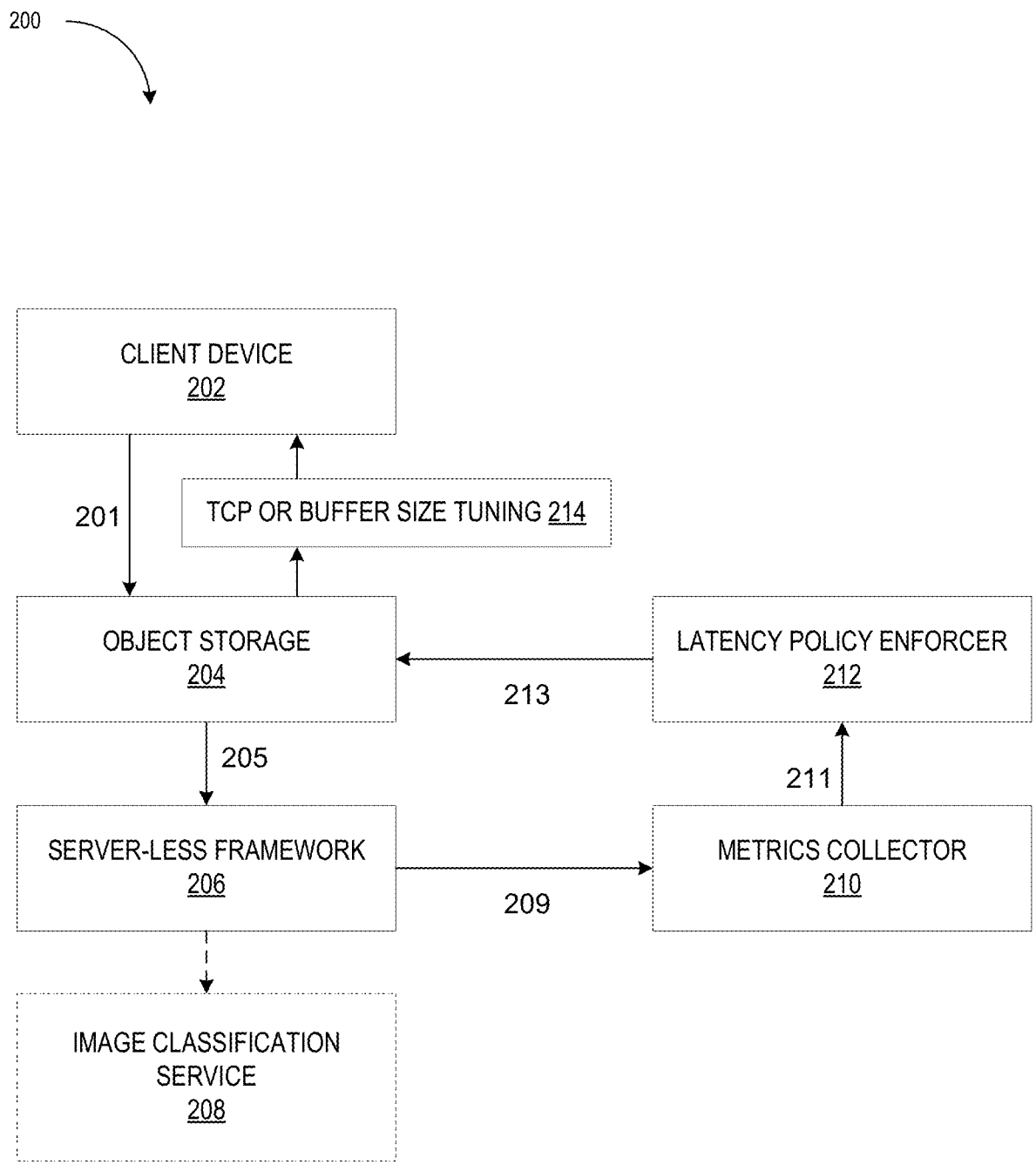
FIG. 2 is a block diagram illustrating latency control notification for edge cloud streaming analytics services, in accordance with some embodiments of the present disclosure.

FIG. 2 is a block diagram illustrating latency control notification for edge cloud streaming analytics services, in accordance with some embodiments of the present disclosure. In response to the problems described above, and others, a host latency control notification for edge cloud streaming analytics service is described with respect to FIG. 2. Specifically, such a service may overcome issues related to media files in edge computing networks by explicitly notifying edge streaming processes of the storage and computing resource availability, so that the streaming process can adjust upload transmission control protocol (TCP) windows, upload interval or chunk sizes, or even the quality of the streaming source, to ensure low latency.

In one embodiment, a file's (e.g., a video file, music file, or other media or non-media file) upload 201 start and end timestamps from an edge device (e.g., client device 202) to an object storage device (e.g., object storage 204) may be attached to a bucket notification event by the object storage daemon. In one embodiment, the server-less framework 206 then tracks the entire duration of the upload 205 from the object storage 204 to the server-less framework 206 and reports 209 the server-less end time and the upload timestamps to a metrics collector 210, which may be a part of the server-less framework or any other component of a cloud computing system.

In one embodiment, the latency is then reported 211 to a latency policy enforcer 212. The enforcer 212 then analyzes the (first) upload start and end timestamp, the (second) server-less framework start and end timestamp, and issues 213 tuning instructions to the object storage daemon 204 based on these timestamps. Tuning instructions 214 may then be provided to client device 202 to reduce latency. In one embodiment, the instructions can be based on any combination of the following heuristics:

a. If the upload interval (i.e. the interval between the first start and first end of the upload from the client device 202 to the objection storage device 204) is the dominating latency, then the tuning instructions 214 may cause the client device 202 to reduce the upload chunk or the file size. The goal is to accelerate upload so the videos can be processed without delay.

b. If the server-less execution duration is the dominating latency (e.g., the interval between a second start and end timestamp corresponding to the upload to the server-less framework 206), the tuning instructions 214 may cause the client device 202 to reduce the upload chunk or the file size. The goal is to partition the video into smaller files so they can be processed by more Serverless functions and thus the latency of each function is less.

c. If the wait for server-less function is the dominating latency (e.g., the interval between the first end timestamp of the upload to object storage 204 and the second start timestamp of the upload to server-less framework 206), e.g., due to system overload, then the tuning instruction 214 may cause the client device to increase the upload chunk or the file size (so that fewer videos are uploaded and thus the number of active server-less functions is reduced in the system), or modify TCP level tuning to slow client device 202 at a networking level.

In one embodiment, the object storage 204 communicates with the client device 202 about these instructions 214 using one or a combination of the following mechanisms:

a. A special Hypertext Transfer Protocol (HTTP) header. When the client device 202 uploader starts an HTTP session, special HTTP headers are returned to the client device 202 uploader by the object storage 204 daemon. The HTTP headers provide heuristics for upload chunk and file sizes. For example: {chunk-size: 5 MiB file-size: 50 MiB}.

b. HTTP Reply latency. If the client device 202 uploader does not comply with instructions in the HTTP header, the object storage 204 daemon delays HTTP replies to each chunk upload.

c. TCP level. The object storage 204 daemon sets traffic control at TCP level, including window size and acknowledgement strategies.

In one embodiment, resulting uploaded files may then be provided to an artificial intelligence (AI) component (e.g., an image classification service 208) for further processing.

Figure 3:
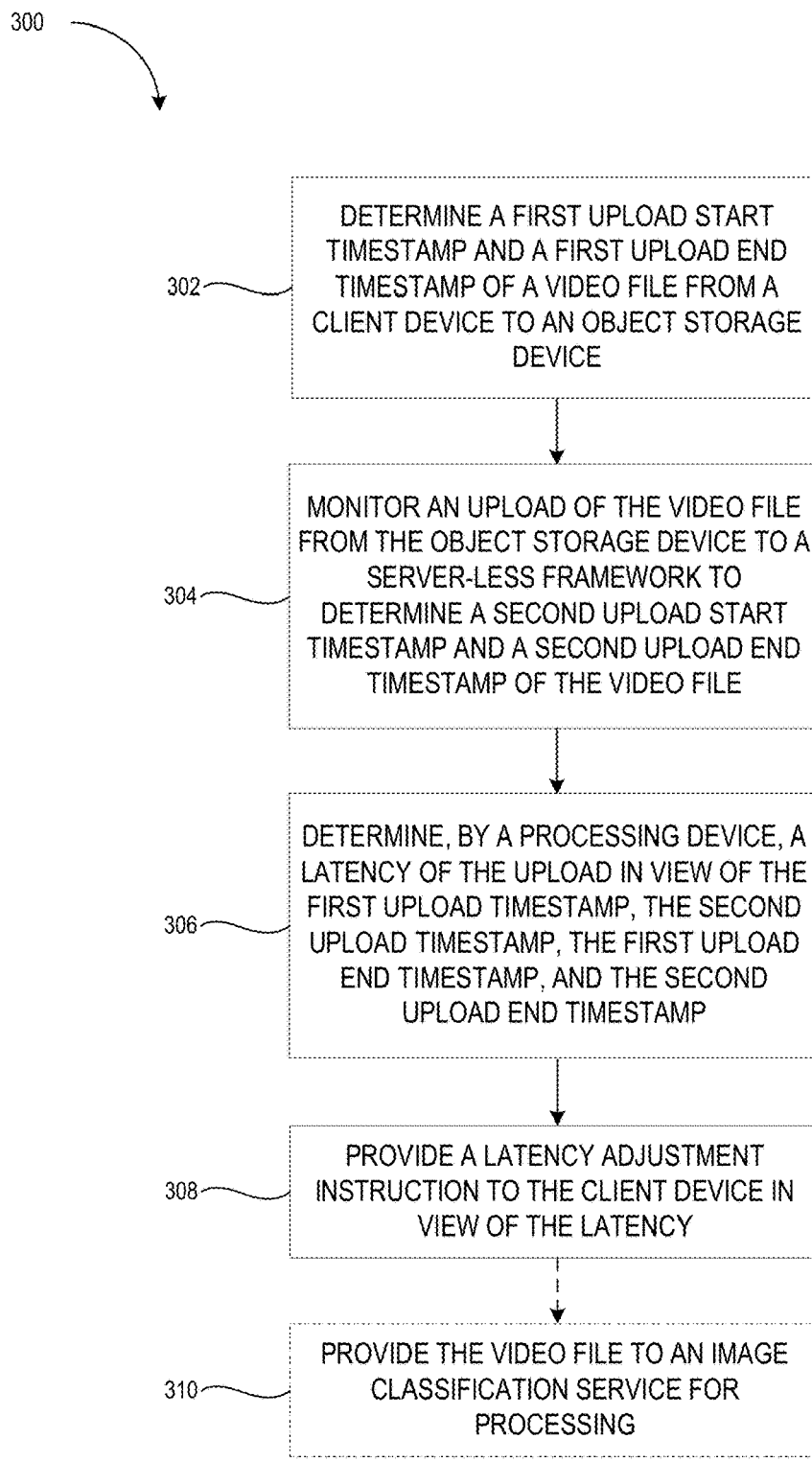
FIG. 3 is a flow diagram of a method of latency control notification for edge cloud streaming analytics services, in accordance with some embodiments of the present disclosure.

FIG. 3 is a flow diagram of a method of latency control notification for edge cloud streaming analytics services, in accordance with some embodiments of the present disclosure. The method 300 may be performed by processing logic that comprises hardware (e.g., circuitry, dedicated logic, programmable logic, microcode, etc.), software (e.g., instructions run on a processing device to perform hardware simulation), or a combination thereof. In one embodiment, processing logic corresponding to one or more components of FIG. 1A-C may perform one or more of the following operations. For example, in one embodiment, processing logic of processing device 120 performs the following operations, with respect to the individual components of FIG. 1A-C. In another embodiment, any other suitable processing device may perform the described operations.

Referring to FIG. 3, at block 302, processing logic may determine a first upload start timestamp and a first upload end timestamp of a video file (or any other media or non-media file) from a client device to an object storage device. Processing logic at block 304 may then monitor (or analyze) an upload of the video file from the object storage device to a server-less framework to determine a second upload start timestamp and a second upload end timestamp of the video file. In one embodiment, the monitoring is performed by the server-less framework.

At block 306, processing logic may determine a latency, (and a cause or source of the latency), of the upload in view of the first upload timestamp, the second upload timestamp, the first upload end timestamp, and the second upload end timestamp. In one embodiment a plurality of latencies is determined with respect to the transfer/upload of the media file to and from various components of the system. Processing logic at block 308 may then determine and/or provide a latency adjustment instruction to the client device in view of the latency. For example, in one embodiment, the latency adjustment instruction is to cause the client device to reduce an upload chunk or a file size of the video file when an interval between the first upload start timestamp and the first upload end timestamp exceeds a predetermined threshold. In this embodiment, with respect to FIG. 2, if the upload interval (i.e. the interval between the first start and first end of the upload from the client device 202 to the objection storage device 204) is the dominating latency, then the tuning instructions 214 may cause the client device 202 to reduce the upload chunk or the file size. The goal is to accelerate upload so the videos can be processed without delay.

In another embodiment, the latency adjustment instruction is to cause the client device to reduce an upload chunk or a file size of the video file when an interval between the second upload start timestamp and the second upload end timestamp exceeds a predetermined threshold. In this embodiment, with respect to FIG. 2, if the server-less execution duration is the dominating latency (e.g., the interval between a second start and end timestamp corresponding to the upload to the server-less framework 206), the tuning instructions 214 may cause the client device 202 to reduce the upload chunk or the file size. The goal is to partition the video into smaller files so they can be processed by more server-less functions and thus the latency of each function is less.

In another embodiment, the latency adjustment instruction is to cause the client device to increase an upload chunk or a file size of the video file when an interval between the first upload end timestamp and the second upload start timestamp exceeds a predetermined threshold or cause the client device to modify a transmission control protocol (TCP) window of the upload when an interval between the first upload end timestamp and the second upload start timestamp exceeds a predetermined threshold. In this embodiment, with respect to FIG. 2, if the wait for server-less function is the dominating latency (e.g., the interval between the first end timestamp of the upload to object storage 204 and the second start timestamp of the upload to server-less framework 206), e.g., due to system overload, then the tuning instruction 214 may cause the client device to increase the upload chunk or the file size (so that fewer videos are uploaded and thus the number of active server-less functions is reduced in the system), or modify TCP level tuning to slow client device 202 at a networking level.

In one embodiment, processing logic may cause the communication of such instructions to an edge device to be performed in any number of a variety of methods. For example, in one embodiment, processing logic may return an HTTP header to the client device by the object storage device when the client device starts an HTTP session. In this embodiment, with respect to FIG. 2, when (or after) the client device 202 uploader starts an HTTP session, special HTTP headers may be returned to the client device 202 uploader by the object storage 204 daemon. The HTTP headers provide heuristics for upload chunk and file sizes. For example: {chunk-size: 5 MiB file-size: 50 MiB}.

In another embodiment, processing logic may delay an HTTP reply to each chunk upload when the client device does not comply with instructions in the HTTP header. In this embodiment, with respect to FIG. 2, if the client device 202 uploader does not comply with instructions in the HTTP header, the object storage 204 daemon delays HTTP replies to each chunk upload.

In yet another embodiment, processing logic may set traffic control at a TCP level. In this embodiment, with respect to FIG. 2, the object storage 204 daemon may set traffic control at TCP level, including window size and acknowledgement strategies. As described herein, processing logic may further provide the video (e.g., media) file to an image classification service (or any other suitable service) for processing (310).

Figure 4:
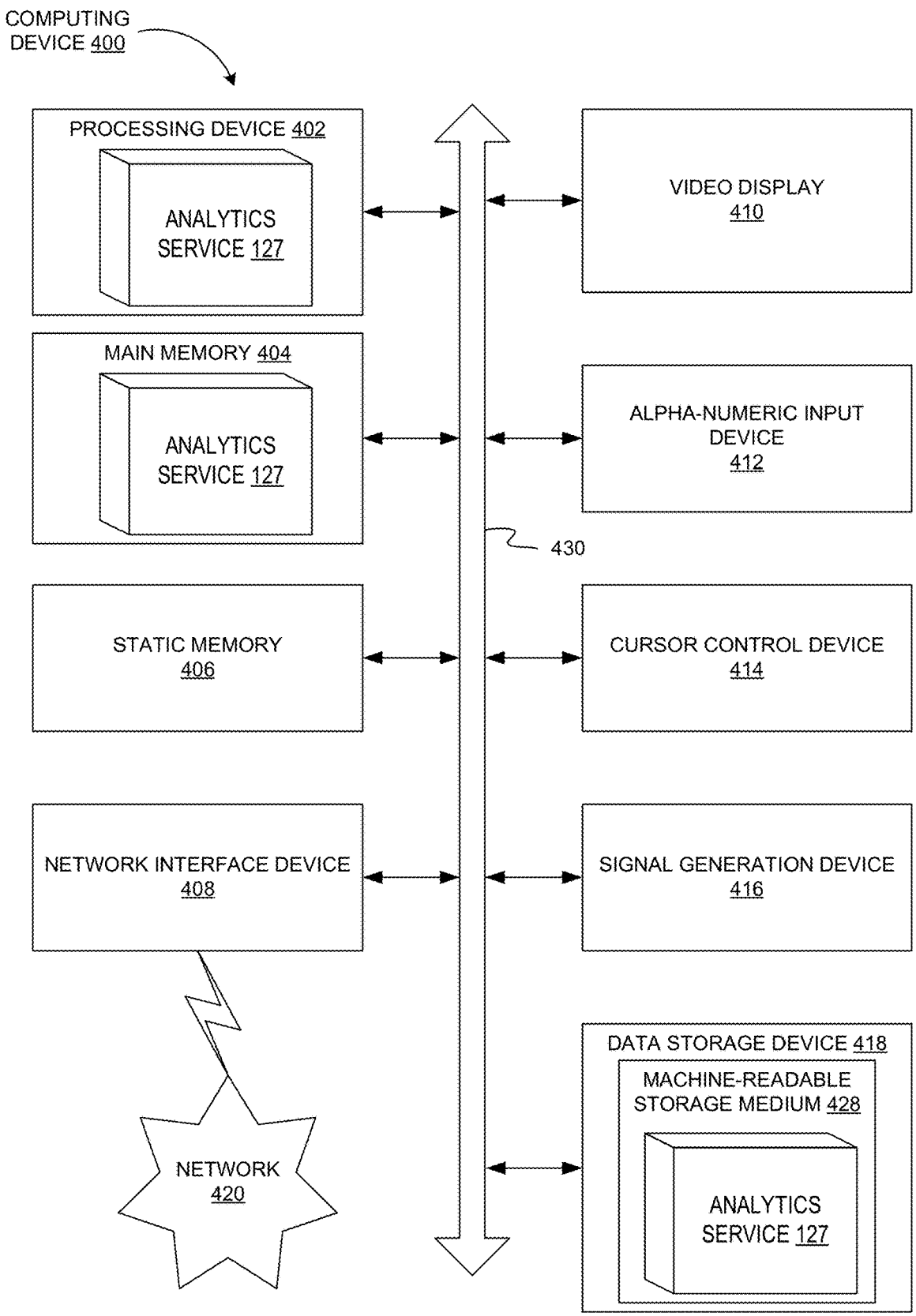
FIG. 4 is a block diagram of an example computing device that may perform one or more of the operations described herein, in accordance with some embodiments of the present disclosure.

FIG. 4 is a block diagram of an example computing device 400 that may perform one or more of the operations described herein, in accordance with some embodiments of the present disclosure. Computing device 400 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 400 may include a processing device (e.g., a general purpose processor, a PLD, etc.) 402, a main memory 404 (e.g., synchronous dynamic random access memory (DRAM), read-only memory (ROM)), a static memory 406 (e.g., flash memory and a data storage device 418), which may communicate with each other via a bus 430.

Processing device 402 may be provided by one or more general-purpose processing devices such as a microprocessor, central processing unit, or the like. In an illustrative example, processing device 402 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 402 may also comprise one or more special-purpose processing devices such as an application specific integrated circuit (ASIC), a field programmable gate array (FPGA), a digital signal processor (DSP), network processor, or the like. The processing device 402 may be configured to execute the operations described herein, in accordance with one or more aspects of the present disclosure, for performing the operations and steps discussed herein. In one embodiment, processing device 402 represents processing device 120 of FIG. 1A. In another embodiment, processing device 402 represents a processing device of a client device (e.g., client device 150 of FIG. 1A).

Computing device 400 may further include a network interface device 408 which may communicate with a network 420. The computing device 400 also may include a video display unit 410 (e.g., a liquid crystal display (LCD) or a cathode ray tube (CRT)), an alphanumeric input device 412 (e.g., a keyboard), a cursor control device 414 (e.g., a mouse) and an acoustic signal generation device 416 (e.g., a speaker). In one embodiment, video display unit 410, alphanumeric input device 412, and cursor control device 414 may be combined into a single component or device (e.g., an LCD touch screen).

Data storage device 418 may include a computer-readable storage medium 428 on which may be stored one or more sets of instructions, e.g., instructions for carrying out the operations described herein, in accordance with one or more aspects of the present disclosure. Instructions implementing analytics service 127 may also reside, completely or at least partially, within main memory 404 and/or within processing device 402 during execution thereof by computing device 400, main memory 404 and processing device 402 also constituting computer-readable media. The instructions may further be transmitted or received over a network 420 via network interface device 408.

While computer-readable storage medium 428 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Example 1 is a method, comprising: determining a first upload start timestamp and a first upload end timestamp of a video file from a client device to an object storage device; monitoring an upload of the video file from the object storage device to a server-less framework to determine a second upload start timestamp and a second upload end timestamp of the video file; determining, by a processing device, a latency of the upload in view of the first upload timestamp, the second upload timestamp, the first upload end timestamp, and the second upload end timestamp; and providing a latency adjustment instruction to the client device in view of the latency.

Example 2 is the method of Example 1, wherein the latency adjustment instruction is to cause the client device to reduce an upload chunk or a file size of the video file when an interval between the first upload start timestamp and the first upload end timestamp exceeds a predetermined threshold.

Example 3 is the method of Example 1, wherein the latency adjustment instruction is to cause the client device to reduce an upload chunk or a file size of the video file when an interval between the second upload start timestamp and the second upload end timestamp exceeds a predetermined threshold.

Example 4 is the method of Example 1, wherein the latency adjustment instruction is to cause the client device to increase an upload chunk or a file size of the video file when an interval between the first upload end timestamp and the second upload start timestamp exceeds a predetermined threshold.

Example 5 is the method of Example 1, wherein the latency adjustment instruction is to cause the client device to modify a transmission control protocol (TCP) window of the upload when an interval between the first upload end timestamp and the second upload start timestamp exceeds a predetermined threshold.

Example 6 is the method of Example 1, wherein the monitoring is performed by the server-less framework.

Example 7 is the method of Example 1, wherein providing the latency adjustment instruction to the client device comprises at least one of: returning an HTTP header to the client device by the object storage device when the client device starts an HTTP session; delaying an HTTP reply to each chunk upload when the client device does not comply with instructions in the HTTP header; or setting traffic control at a TCP level.

Example 8 is the method of Example 1, further comprising providing the video file to an image classification service for processing.

Example 9 is a system, comprising: a memory to store a latency adjustment instruction; and a processing device operatively coupled to the memory, the processing device to: determine a first upload start timestamp and a first upload end timestamp of a media file from a client device to an object storage device; determine a second upload start timestamp and a second upload end timestamp of an upload of the media file from the object storage device to a server-less framework; determine a latency of the upload in view of the first upload timestamp, the second upload timestamp, the first upload end timestamp, and the second upload end timestamp; and provide the latency adjustment instruction to the client device in view of the latency.

Example 10 is the system of Example 9, wherein the latency adjustment instruction is to cause the client device to reduce an upload chunk or a file size of the media file when an interval between the first upload start timestamp and the first upload end timestamp exceeds a predetermined threshold.

Example 11 is the system of Example 9, wherein the latency adjustment instruction is to cause the client device to reduce an upload chunk or a file size of the media file when an interval between the second upload start timestamp and the second upload end timestamp exceeds a predetermined threshold.

Example 12 is the system of Example 9, wherein the latency adjustment instruction is to cause the client device to increase an upload chunk or a file size of the media file when an interval between the first upload end timestamp and the second upload start timestamp exceeds a predetermined threshold.

Example 13 is the system of Example 9, wherein the latency adjustment instruction is to cause the client device to modify a transmission control protocol (TCP) window of the upload when an interval between the first upload end timestamp and the second upload start timestamp exceeds a predetermined threshold.

Example 14 is the system of Example 9, the processing device further to, in real time, analyze the upload of the media file from the object storage device to the server-less framework to determine the second upload start timestamp and the second upload end timestamp.

Example 15 is the system of Example 14, wherein the analyzing is performed by the server-less framework.

Example 16 is the system of Example 19, wherein to provide the latency adjustment instruction to the client device, the processing device is to perform at least one of: return an HTTP header to the client device by the object storage device when the client device starts an HTTP session; delay an HTTP reply to each chunk upload when the client device does not comply with instructions in the HTTP header; or set traffic control at a TCP level.

Example 17 is the system of Example 9, the processing device further to provide the media file to an image classification service for processing.

Example 18 is a non-transitory computer-readable storage medium storing instructions which, when executed by a processing device, cause the processing device to: determine a first upload start timestamp and a first upload end timestamp of a media file from a client device to an object storage device; determine a second upload start timestamp and a second upload end timestamp of an upload of the media file from the object storage device to a server-less framework; determine, by the processing device, a latency of the upload in view of the first upload timestamp, the second upload timestamp, the first upload end timestamp, and the second upload end timestamp; and provide a latency adjustment instruction to the client device in view of the latency.

Example 19 is the non-transitory computer-readable storage medium of Example 18, wherein the latency adjustment instruction is to cause the client device to reduce an upload chunk or a file size of the media file when an interval between the first upload start timestamp and the first upload end timestamp exceeds a predetermined threshold.

Example 20 is the non-transitory computer-readable storage medium of Example 18, wherein the latency adjustment instruction is to cause the client device to reduce an upload chunk or a file size of the media file when an interval between the second upload start timestamp and the second upload end timestamp exceeds a predetermined threshold.

Example 21 is the non-transitory computer-readable storage medium of Example 18, wherein the latency adjustment instruction is to cause the client device to increase an upload chunk or a file size of the media file when an interval between the first upload end timestamp and the second upload start timestamp exceeds a predetermined threshold.

Example 22 is non-transitory computer-readable storage medium of Example 18, wherein the latency adjustment instruction is to cause the client device to modify a transmission control protocol (TCP) window of the upload when an interval between the first upload end timestamp and the second upload start timestamp exceeds a predetermined threshold.

Example 23 is non-transitory computer-readable storage medium of Example 18, the processing device further to, in real time, analyze the upload of the media file from the object storage device to the server-less framework to determine the second upload start timestamp and the second upload end timestamp.

Example 23 is the non-transitory computer-readable storage medium of Example 18, wherein the analyzing is performed by the server-less framework.

Example 25 is the non-transitory computer-readable storage medium of Example 18, wherein to provide the latency adjustment instruction to the client device, the processing device is to perform at least one of: return an HTTP header to the client device by the object storage device when the client device starts an HTTP session; delay an HTTP reply to each chunk upload when the client device does not comply with instructions in the HTTP header; or set traffic control at a TCP level.

Example 26 is the non-transitory computer-readable storage medium of Example 18, the processing device further to provide the media file to an image classification service for processing.

Example 27 is an apparatus, comprising: means for determining a first upload start timestamp and a first upload end timestamp of a video file from a client device to an object storage device; mean for monitoring an upload of the video file from the object storage device to a server-less framework to determine a second upload start timestamp and a second upload end timestamp of the video file; means for determining, by a processing device, a latency of the upload in view of the first upload timestamp, the second upload timestamp, the first upload end timestamp, and the second upload end timestamp; and means for providing a latency adjustment instruction to the client device in view of the latency.

Example 28 is the apparatus of Example 27, wherein the latency adjustment instruction is to cause the client device to reduce an upload chunk or a file size of the video file when an interval between the first upload start timestamp and the first upload end timestamp exceeds a predetermined threshold.

Example 29 is the apparatus of Example 27, wherein the latency adjustment instruction is to cause the client device to reduce an upload chunk or a file size of the video file when an interval between the second upload start timestamp and the second upload end timestamp exceeds a predetermined threshold.

Example 30 is the apparatus of Example 27, wherein the latency adjustment instruction is to cause the client device to increase an upload chunk or a file size of the video file when an interval between the first upload end timestamp and the second upload start timestamp exceeds a predetermined threshold.

Example 31 is the apparatus of Example 27, wherein the latency adjustment instruction is to cause the client device to modify a transmission control protocol (TCP) window of the upload when an interval between the first upload end timestamp and the second upload start timestamp exceeds a predetermined threshold.

Example 32 is the apparatus of Example 27, wherein the monitoring is performed by the server-less framework.

Example 33 is the apparatus of Example 27, wherein providing the latency adjustment instruction to the client device comprises at least one of: returning an HTTP header to the client device by the object storage device when the client device starts an HTTP session; delaying an HTTP reply to each chunk upload when the client device does not comply with instructions in the HTTP header; or setting traffic control at a TCP level.

Example 34 is the apparatus of Example 27, comprising: means for providing the video file to an image classification service for processing.

Example 35 is a cloud platform, comprising: a memory to store a latency adjustment instruction; and a processing device operatively coupled to the memory, the processing device to: determine a first upload start timestamp and a first upload end timestamp of a media file from a client device to an object storage device; determine a second upload start timestamp and a second upload end timestamp of an upload of the media file from the object storage device to a server-less framework; determine a latency of the upload in view of the first upload timestamp, the second upload timestamp, the first upload end timestamp, and the second upload end timestamp; and provide the latency adjustment instruction to the client device in view of the latency.

Example 36 is the cloud platform of Example 35, wherein the latency adjustment instruction is to cause the client device to reduce an upload chunk or a file size of the media file when an interval between the first upload start timestamp and the first upload end timestamp exceeds a predetermined threshold.

Example 37 is the cloud platform of Example 35, wherein the latency adjustment instruction is to cause the client device to reduce an upload chunk or a file size of the media file when an interval between the second upload start timestamp and the second upload end timestamp exceeds a predetermined threshold.

Example 38 is the cloud platform of Example 35, wherein the latency adjustment instruction is to cause the client device to increase an upload chunk or a file size of the media file when an interval between the first upload end timestamp and the second upload start timestamp exceeds a predetermined threshold.

Example 39 is the cloud platform of Example 35, wherein the latency adjustment instruction is to cause the client device to modify a transmission control protocol (TCP) window of the upload when an interval between the first upload end timestamp and the second upload start timestamp exceeds a predetermined threshold.

Example 40 is the cloud platform of Example 35, wherein the processing device further to, in real time, analyze the upload of the media file from the object storage device to the server-less framework to determine the second upload start timestamp and the second upload end timestamp.

Example 41 is the cloud platform of Example 40, wherein the analyzing is performed by the server-less framework.

Example 42 is the cloud platform of Example 35, wherein to provide the latency adjustment instruction to the client device, the processing device is to perform at least one of: return an HTTP header to the client device by the object storage device when the client device starts an HTTP session; delay an HTTP reply to each chunk upload when the client device does not comply with instructions in the HTTP header; or set traffic control at a TCP level.

Example 43 is the cloud platform of Example 35, the processing device further to provide the media file to an image classification service for processing.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
    determining a first upload start timestamp and a first upload end timestamp of a video file from a client device to an object storage device;
    monitoring an upload of the video file from the object storage device to a server-less framework to determine a second upload start timestamp and a second upload end timestamp of the video file;
    determining, by a processing device, a latency of the upload in view of the first upload timestamp, the second upload timestamp, the first upload end timestamp, and the second upload end timestamp; and
    providing a latency adjustment instruction to the client device in view of the latency.

2. The method of claim 1, wherein the latency adjustment instruction is to cause the client device to reduce an upload chunk or a file size of the video file when an interval between the first upload start timestamp and the first upload end timestamp exceeds a predetermined threshold.

3. The method of claim 1, wherein the latency adjustment instruction is to cause the client device to reduce an upload chunk or a file size of the video file when an interval between the second upload start timestamp and the second upload end timestamp exceeds a predetermined threshold.

4. The method of claim 1, wherein the latency adjustment instruction is to cause the client device to increase an upload chunk or a file size of the video file when an interval between the first upload end timestamp and the second upload start timestamp exceeds a predetermined threshold.

5. The method of claim 1, wherein the latency adjustment instruction is to cause the client device to modify a transmission control protocol (TCP) window of the upload when an interval between the first upload end timestamp and the second upload start timestamp exceeds a predetermined threshold.

6. The method of claim 1, wherein the monitoring is performed by the server-less framework.

7. The method of claim 1, wherein providing the latency adjustment instruction to the client device comprises at least one of:
    returning an HTTP header to the client device by the object storage device when the client device starts an HTTP session;
    delaying an HTTP reply to each chunk upload when the client device does not comply with instructions in the HTTP header; or
    setting traffic control at a TCP level.

8. The method of claim 1, further comprising providing the video file to an image classification service for processing.

9. A system, comprising:
    a memory to store a latency adjustment instruction; and
    a processing device operatively coupled to the memory, the processing device to:
        determine a first upload start timestamp and a first upload end timestamp of a media file from a client device to an object storage device;
        determine a second upload start timestamp and a second upload end timestamp of an upload of the media file from the object storage device to a server-less framework;
        determine a latency of the upload in view of the first upload timestamp, the second upload timestamp, the first upload end timestamp, and the second upload end timestamp; and
        provide the latency adjustment instruction to the client device in view of the latency.

10. The system of claim 9, wherein the latency adjustment instruction is to cause the client device to reduce an upload chunk or a file size of the media file when an interval between the first upload start timestamp and the first upload end timestamp exceeds a predetermined threshold.

11. The system of claim 9, wherein the latency adjustment instruction is to cause the client device to reduce an upload chunk or a file size of the media file when an interval between the second upload start timestamp and the second upload end timestamp exceeds a predetermined threshold.

12. The system of claim 9, wherein the latency adjustment instruction is to cause the client device to increase an upload chunk or a file size of the media file when an interval between the first upload end timestamp and the second upload start timestamp exceeds a predetermined threshold.

13. The system of claim 9, wherein the latency adjustment instruction is to cause the client device to modify a transmission control protocol (TCP) window of the upload when an interval between the first upload end timestamp and the second upload start timestamp exceeds a predetermined threshold.

14. The system of claim 9, the processing device further to, in real time, analyze the upload of the media file from the object storage device to the server-less framework to determine the second upload start timestamp and the second upload end timestamp.

15. The system of claim 14, wherein the analyzing is performed by the server-less framework.

16. The system of claim 15, wherein to provide the latency adjustment instruction to the client device, the processing device is to perform at least one of:
    return an HTTP header to the client device by the object storage device when the client device starts an HTTP session;
    delay an HTTP reply to each chunk upload when the client device does not comply with instructions in the HTTP header; or
    set traffic control at a TCP level.

17. The system of claim 9, the processing device further to provide the media file to an image classification service for processing.

18. A non-transitory computer-readable storage medium storing instructions which, when executed by a processing device, cause the processing device to:
    determine a first upload start timestamp and a first upload end timestamp of a media file from a client device to an object storage device;
    determine a second upload start timestamp and a second upload end timestamp of an upload of the media file from the object storage device to a server-less framework;
    determine, by the processing device, a latency of the upload in view of the first upload timestamp, the second upload timestamp, the first upload end timestamp, and the second upload end timestamp; and
    provide a latency adjustment instruction to the client device in view of the latency.

19. The non-transitory computer-readable storage medium of claim 18, wherein the latency adjustment instruction is to cause the client device to reduce an upload chunk or a file size of the media file when an interval between the first upload start timestamp and the first upload end timestamp exceeds a predetermined threshold.

20. The non-transitory computer-readable storage medium of claim 18, wherein the latency adjustment instruction is to cause the client device to reduce an upload chunk or a file size of the media file when an interval between the second upload start timestamp and the second upload end timestamp exceeds a predetermined threshold.

* * * * *